United States Patent
Phillips (10) Patent No.: US 8,706,628 B2
(45) Date of Patent: Apr. 22, 2014

(54) AUTOMATED OPENING OF ELECTRONIC WALLET FUNCTION IN MOBILE DEVICE

(75) Inventor: Simon Phillips, York (GB)

(73) Assignee: Mastercard International Incorporated, Purchase, NY (US)

( * ) Notice: Subject to any disclaimer, the term of this patent is extended or adjusted under 35 U.S.C. 154(b) by 324 days.

(21) Appl. No.: 12/392,390

(22) Filed: Feb. 25, 2009

(65) Prior Publication Data

US 2010/0217707 A1 Aug. 26, 2010

(51) Int. Cl.
*G06Q 40/00* (2012.01)
*G06Q 20/36* (2012.01)
*G06Q 20/32* (2012.01)

(52) U.S. Cl.
CPC ............... *G06Q 40/00* (2013.01); *G06Q 20/36* (2013.01); *G06Q 20/367* (2013.01); *G06Q 20/3224* (2013.01); *G06Q 20/3278* (2013.01)
USPC .......................................... 705/41; 705/35

(58) Field of Classification Search
CPC . G06Q 40/00; G06Q 20/367; G06Q 20/3224; G06Q 20/32278; G06Q 30/36
USPC ..................................................... 705/41, 35
See application file for complete search history.

(56) References Cited

U.S. PATENT DOCUMENTS

| | | | | |
|---|---|---|---|---|
| 6,076,075 A | * | 6/2000 | Teicher | 705/41 |
| 6,970,850 B1 | * | 11/2005 | Freeny, Jr. | 705/52 |
| 7,707,113 B1 | * | 4/2010 | DiMartino et al. | 705/44 |
| 7,967,196 B1 | * | 6/2011 | Bierbaum et al. | 235/380 |
| 8,035,521 B2 | * | 10/2011 | Lees | 340/572.4 |
| 8,126,806 B1 | * | 2/2012 | DiMartino et al. | 705/41 |
| 2006/0160488 A1 | * | 7/2006 | Sueoka et al. | 455/41.2 |
| 2006/0189345 A1 | | 8/2006 | Suzuki et al. | |
| 2008/0046366 A1 | * | 2/2008 | Bemmel et al. | 705/44 |
| 2009/0065575 A1 | * | 3/2009 | Phillips et al. | 235/380 |
| 2009/0100511 A1 | * | 4/2009 | Phillips et al. | 726/9 |

OTHER PUBLICATIONS

Hafner, K. (Mar. 2, 2000). Wireless payment systems might mean dialing inot your own wallet. New York Times. Retrieved Nov. 25, 2013.*

* cited by examiner

*Primary Examiner* — Kito R Robinson
(74) *Attorney, Agent, or Firm* — Buckley, Maschoff & Talwalkar LLC (57) ABSTRACT

A method includes bringing a mobile device into proximity with an indicium, the indicium adjacent a radio frequency identification (RFID) integrated circuit (IC), the RFID IC coupled to an antenna. The method further includes the mobile device reading a message from the RFID IC, where the message is transmitted by the RFID IC via the antenna. The method further includes the mobile device responding to the message by opening an electronic wallet function in the mobile device.

19 Claims, 7 Drawing Sheets

AUTOMATED OPENING OF ELECTRONIC WALLET FUNCTION IN MOBILE DEVICE

BACKGROUND

Payment cards such as credit or debit cards are ubiquitous. For decades, such cards have included a magnetic stripe on which the relevant account number is stored. To consummate a purchase transaction with such a card, the card is swiped through a magnetic stripe reader that is part of a point of sale (POS) terminal. The reader reads the account number from the magnetic stripe. The account number is then used to route a transaction authorization request that is initiated by the POS terminal.

In pursuit of still greater convenience and more rapid transactions at POS terminals, payment cards have more recently been developed that allow the account number to be automatically read from the card by radio frequency communication between the card and a so-called "proximity reader" which may be incorporated with the POS terminal. In such cards, often referred to as "proximity payment cards" or "contactless payment cards", a radio frequency identification (RFID) integrated circuit (IC, often referred to as a "chip") is embedded in the card body. A suitable antenna is also embedded in the card body and is connected to the RFID chip to allow the chip to receive and transmit data by RF communication via the antenna. In typical arrangements, the RFID chip is powered from an interrogation signal that is transmitted by the proximity reader and received by the card antenna.

MasterCard International Incorporated, the assignee hereof, has established a widely-used standard, known as "PayPass", for interoperability of contactless payment cards and proximity readers. It has also been proposed to use wireless exchanges of information via NFC (Near Field Communication) for payment applications.

It has been proposed that the capabilities of a contactless payment card be incorporated into a mobile telephone, thereby turning the mobile telephone into a contactless payment device. Typically a mobile telephone/contactless payment device includes integrated circuitry with the same functionality as the RFID IC of a contactless payment card. In addition, the mobile telephone/contactless payment device includes a loop antenna that is coupled to the payment-related IC for use in sending and/or receiving messages in connection with a transaction that involves contactless payment.

In a provisional U.S. patent application filed Jun. 4, 2008 and assigned provisional application No. 61/058,704, the present inventor disclosed aspects of a user interface for payment-related functions in a mobile telephone. The contents of the '704 provisional patent application are incorporated herein by reference.

In a typical contactless payment transaction, the user may be prompted to enter a PIN (personal identification number) as a security measure to guard against unauthorized usage of stolen contactless payment devices. However, the entry of a PIN occupies time while the user is at the point of sale, and may slow down the process of carrying out contactless payment transactions.

In the present document, there are disclosed novel features and ways of interacting with a contactless-payment-enabled mobile telephone, with particular emphasis on enhancing speed and convenience of purchase transactions using such a mobile telephone.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, an electronic wallet function in a mobile device (such as a mobile telephone) may be opened by having the mobile device read a message from a passive RFID tag. For example, the RFID tag may be provided a short distance from a POS terminal. The customer may tap the mobile device on the RFID tag, so that the mobile device reads the RFID tag. In response to the message received by the mobile device from the RFID tag, the mobile device opens an electronic wallet function, thereby allowing the user to select a particular payment card account number for the present transaction (if necessary, and assuming that the mobile device stores more than one payment card account number), and to enter his/her PIN. All this may occur before the user arrives at the POS terminal. That is, the RFID tag may be located upstream along the queue for the checkout counter. In this way, once the user arrives at the POS terminal, he/she has already selected the account and entered his/her PIN and only needs to tap the mobile device on the contactless reader at the POS terminal in order to consummate the transaction. This may significantly streamline and speed up handling of transactions at the point of sale.

Figure 1:
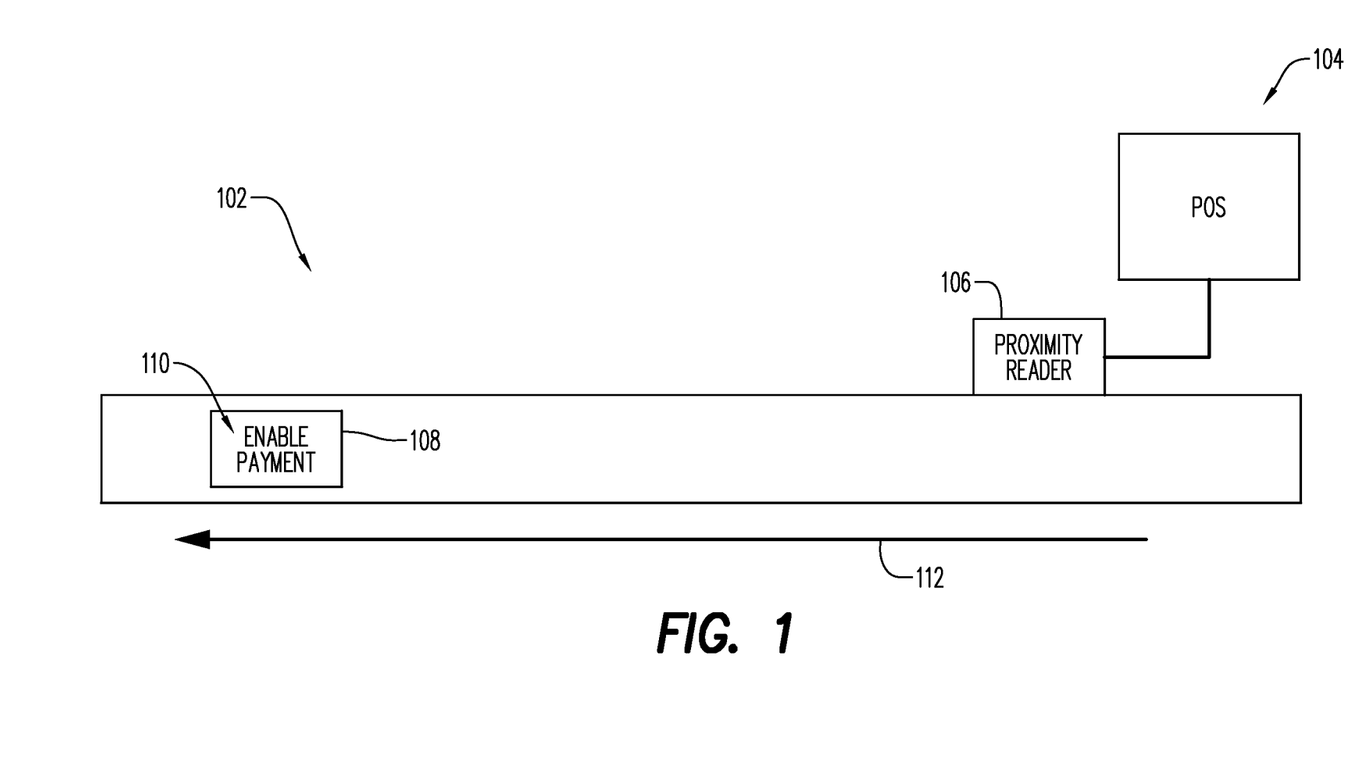
FIG. 1 is a schematic front elevational view of a retail store checkout counter provided according to one aspect of the present invention.

FIG. 1 is a schematic front elevational view of a retail store checkout counter 102 provided according to one aspect of the present invention. At one end of the counter a POS terminal 104 is installed, including a proximity reader 106 for reading contactless payment devices. The POS terminal 104 and the proximity reader 106 may be entirely conventional.

At an opposite end of the counter from the POS terminal 104, there is an RFID tag 108 affixed to the counter. Details of the RFID tag 108 will be provided below. However, it is notable that an indicium 110 is provided on the RFID tag 108 to visually cue users to the presence and purpose of the RFID tag. For example, the indicium 110 may be a printed legend such as "Tap payment phone here", "Enable payment", etc. In other embodiments, the indicium may be a symbol or logo that has been promoted to the public as symbolizing a wallet-opening RFID tag, as described herein.

The arrow mark 112 in FIG. 1 schematically indicates the upstream direction of a queue in which customers (not shown) may await their turn at the POS terminal 104. It will be noted that the RFID tag 108 is located upstream from the POS terminal 104, and may be some distance, perhaps five to ten feet, away from the POS terminal.

Figure 2:
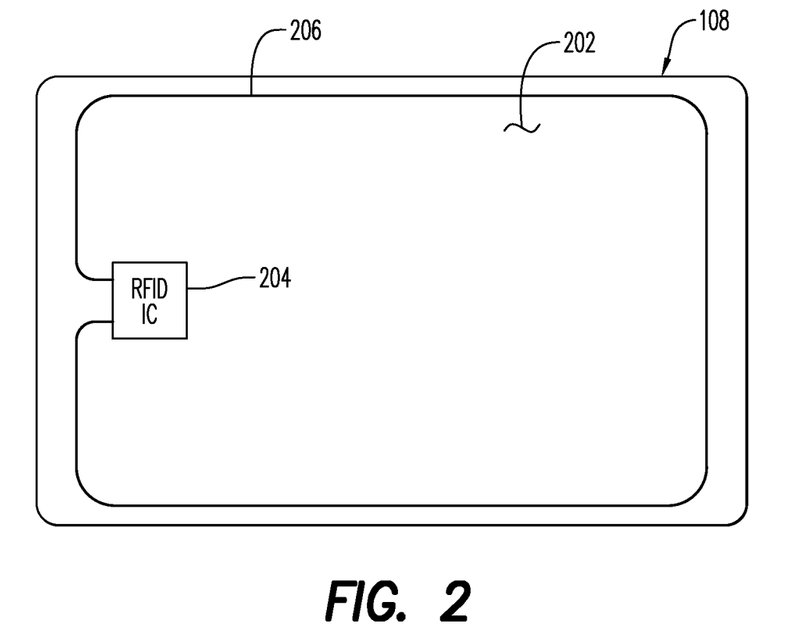
FIG. 2 is a schematic plan view of an example of a wallet function opening device (RFID tag) provided according to aspects of the present invention and included in the checkout counter of FIG. 1.

In some embodiments, the RFID tag 108 may take the form of a sticker that may be readily adhered to the counter and that may be mass produced at a very low cost. FIG. 2 is a schematic plan view of an example embodiment of the RFID tag 108.

As seen from FIG. 2, the RFID tag 108 includes a body 202 which may be generally planar and rectangular in shape and which may be formed of one or more layers of paper or flexible plastic sheet. An adhesive backing layer, which is not separately shown, may be carried on a rear surface of the tag body 202. (Also not shown is the indicium 110 that was discussed above in connection with FIG. 1. The indicium may be printed on a front surface of the tag body 202.) An RFID (radio frequency identification) chip 204 (IC or integrated circuit) is embedded in the tag body 202. (Given that the RFID tag 108 is likely quite thin, it will be apparent that the RFID IC 204 is adjacent the above-mentioned indicium.) An antenna 206 is embedded in the tag body 202 and runs along the periphery of the tag body 202. The antenna 206 is coupled to the RFID chip 204 to allow the RFID chip 204 to receive interrogation signals from portable electronic devices such as a payment-enabled mobile telephone, equipped with an RFID tag reader, as described below. The antenna 206 also allows the RFID chip 204 to transmit a code or message, previously stored in the RFID chip 204, to the RFID tag reader. The code or message transmitted by the RFID chip 204 may have been selected as a cue to the RFID tag reader (or to a device of which it is a part) to engage in certain behavior. In particular, the code or message may prompt the device which incorporates the tag reader to open a wallet function and to allow the user of the device to select an identification number/payment card account number for use in an ensuing transaction and to enter a PIN required to authorize the transaction.

The RFID tag 108 may be constructed and may operate in accordance with conventional practices (apart from the device behavior instigated by the code transmitted from the RFID tag 108). For purposes of illustration, the RFID chip and antenna are shown in FIG. 2, but in practical examples of the RFID tag 108 the tag body may be formed largely of opaque plastic and/or paper and the RFID chip and antenna may be embedded in the opaque plastic and/or paper so as not to be visible. Instead, the RFID tag 108 may display the above mentioned indicium 110 (FIG. 1, not shown in FIG. 2).

Figure 3:
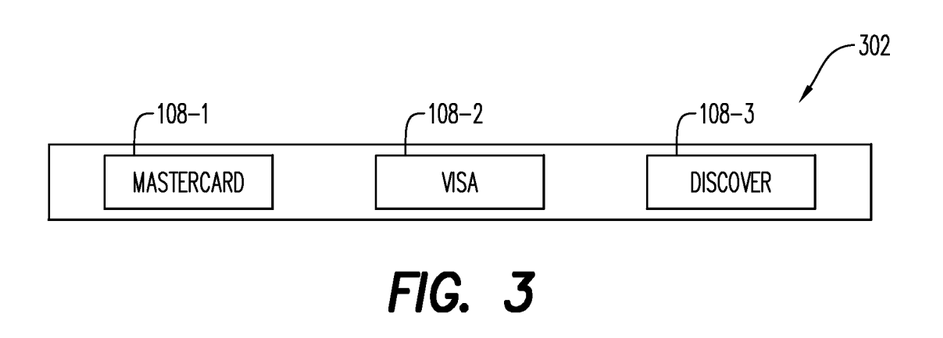
FIG. 3 is a schematic plan view of an alternative embodiment of a wallet function opening device.

In an alternative embodiment of the invention, one or more RFID tags may be incorporated in a purchase separator. The latter term refers to a bar-shaped object, of plastic or other material, customarily employed at supermarket checkout conveyors to separate one customer's group of purchased items from another customer's group of purchased items. FIG. 3 is a schematic plan view of such a purchase separator (generally indicated by reference numeral 302), provided in accordance with aspects of the present invention with a plurality of RFID tags like that shown in FIG. 2.

In the particular embodiment shown in FIG. 3, three RFID tags 108-1, 108-2 and 108-3 are adhered to or embedded in the purchase separator 302 at spaced locations along the length dimension of the purchase separator. It will be noted that the RFID tags 108-1, 108-2, 108-3 each carry mutually different indicia 110-1, 110-2, 110-3, which correspond in this instance to well-known brands of payment cards. In addition, the respective RFID chips 204 (FIG. 2, not shown in FIG. 3) in each of the RFID tags 108-1, 108-2, 108-3 may store (and transmit on request) a respective code or message that corresponds to the particular payment card brand that is indicated by the tag's respective indicium 110-1, 110-2, 110-3, as the case may be. As will be seen, the customer may select a brand of payment card account for use in the current transaction by selecting one of the tags 108-1, 108-2, 108-3 on which the customer chooses to tap his/her mobile telephone. It will be assumed that the customer has previously stored, in his/her mobile telephone, payment card account information corresponding to at least one, and possibly all three, of the payment card brands indicated in FIG. 3.

Figure 4:
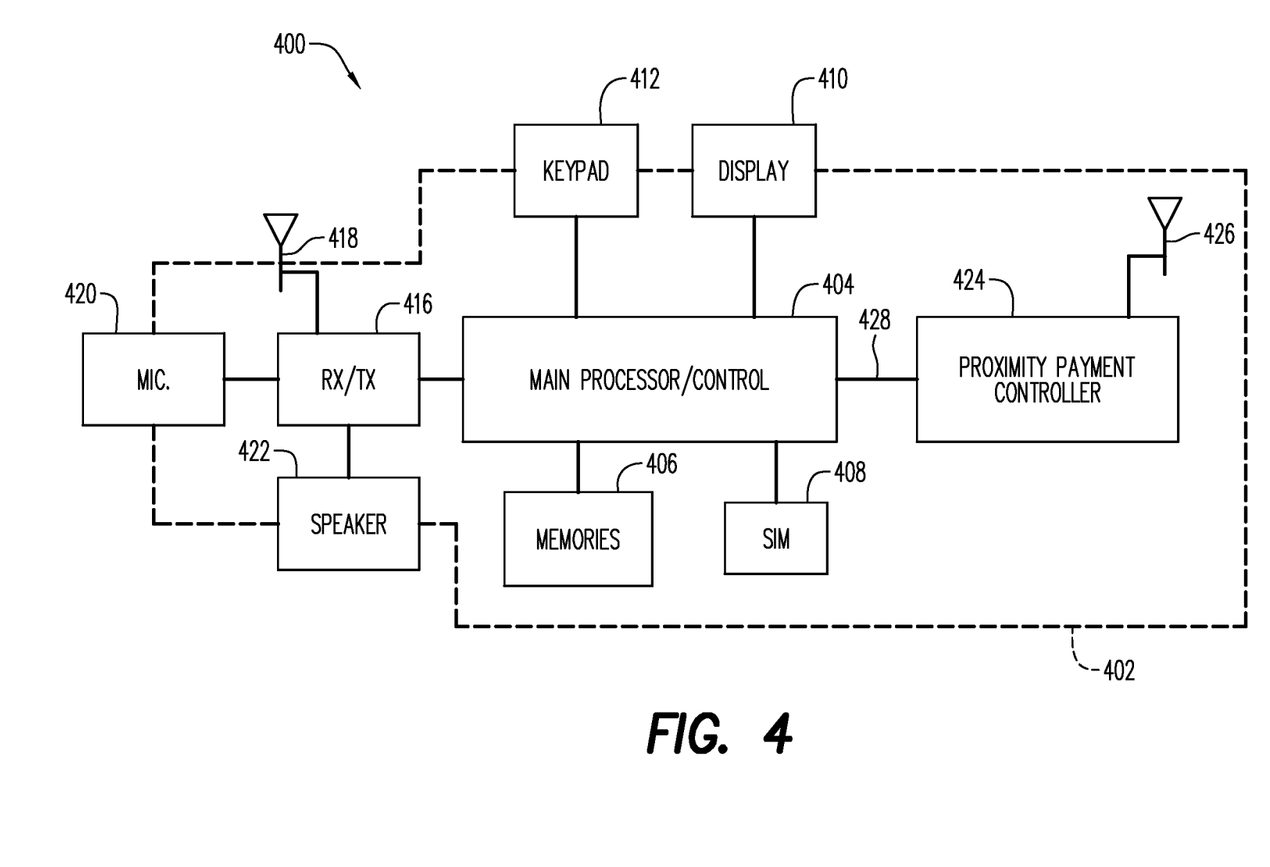
FIG. 4 is a block diagram representation of a mobile telephone provided in accordance with aspects of the present invention.

FIG. 4 is a block diagram representation of a mobile telephone 400 provided in accordance with aspects of the present invention. Since the mobile telephone 400 is also operable for contactless payment transactions, in addition to conventional mobile telephone functions, it will sometimes be referred to herein as a mobile telephone/contactless payment device. The mobile telephone 400 may be conventional in its hardware aspects, except for certain aspects of the payment circuit which is described below.

The mobile telephone/contactless payment device 400 may include a conventional housing (indicated by dashed line 402 in FIG. 4) that contains and/or supports the other components of the mobile telephone/contactless payment device 400. The housing 402 may be shaped and sized to be held in a user's hand, and may for example fit in the palm of the user's hand.

The mobile telephone/contactless payment device 400 further includes conventional control circuitry 404, for controlling over-all operation of the mobile telephone/contactless payment device 400. Other components of the mobile telephone/contactless payment device 400, which are in communication with and/or controlled by the control circuitry 404, include: (a) one or more memory devices 406 (e.g., program and working memory, etc.); (b) a conventional SIM (subscriber identification module) card 408; (c) a keypad 412 for receiving user input; and (d) a conventional display component 410 for displaying output information to the user. For present purposes the keypad 412 will be understood to include, e.g., a conventional 12-key telephone keypad, in addition to other buttons, switches and keys, such as a conventional rocker-switch/select key combination, soft keys, and send and end keys.

The mobile telephone/contactless payment device 400 also includes conventional receive/transmit circuitry 416 that is also in communication with and/or controlled by the control circuitry 404. The receive/transmit circuitry 416 (also referred to as a "voice signal transceiver") is coupled to an antenna 418 and provides the communication channel(s) by which the mobile telephone/contactless payment device 400 communicates via the mobile telephone communication network (not shown). The mobile telephone/contactless payment device 400 further includes a conventional microphone 420, coupled to the receive/transmit circuitry 416. Of course, the microphone 420 is for receiving voice input from the user. In addition, a loudspeaker 422 is included to provide sound output to the user, and is coupled to the receive/transmit circuitry 416.

In conventional fashion, the receive/transmit circuitry 416 operates to transmit, via the antenna 418, voice signals generated by the microphone 420, and operates to reproduce, via the loudspeaker 422, voice signals received via the antenna 418. The receive/transmit circuitry 416 may also handle transmission and reception of text messages and/or other data communications via the antenna 418.

The mobile telephone/contactless payment device 400 may also include a payment circuit 424 and a loop antenna 426, coupled to the payment circuit 424. The payment circuit 424 may include functionality that allows the mobile telephone 400 to serve as a contactless payment device. In addition, the payment circuit 424 may include functionality to allow the mobile telephone 400 to read RFID tags in accordance with aspects of the present invention. Details of the payment circuit 424 are shown in block diagram form in FIG. 5.

Figure 5:
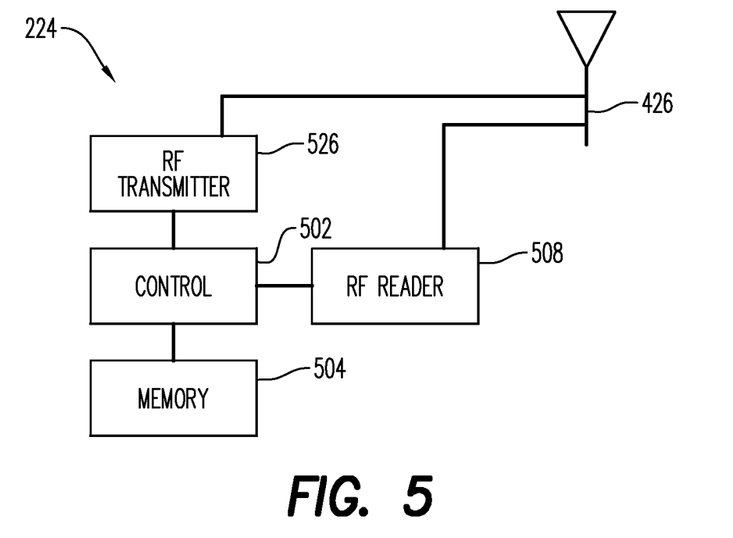
FIG. 5 is a block diagram that shows details of a proximity payment controller component included in the mobile telephone of FIG. 4.

Referring then to FIG. 5, the payment circuit 424 includes a control circuit 502. The control circuit 502 may be a microprocessor or microcontroller or a circuit with similar functionality. Although shown as separate from the main processor 404 (FIG. 4), the control circuit 502 may be integrated with the main processor. If separate from the main processor 404, the control circuit 502 may be in communication therewith (as suggested by connection 428 shown in FIG. 4).

Continuing to refer to FIG. 5, the payment circuit 424 further includes a memory 504 that is in communication with the control circuit 502. The memory 504 may be constituted by one or more different devices, and may overlap at least partially with the memories 406 shown in FIG. 4. (Alternatively, the memory 504 may be separate from the memories 406 shown in FIG. 4.) The memory 504 may store program instructions that control the operation of the control circuit 502 and that cause the control circuit to operate in the manner described herein.

The payment circuit 424 may also include an RF transmitter 506 coupled to the antenna 426 and the control circuit 502. The RF transmitter 506 may be under control by the control circuit 502 and may operate in a conventional manner. That is, the RF transmitter 506 may respond to interrogation signals (received from external RF readers—not shown) by transmitting a payment card account number or other identifying operation. The RF transmitter 506 may operate in accordance with one or more conventional RFID standards, such as the above-mentioned PayPass and NFC standards.

In addition, and in accordance with aspects of the present invention, the payment circuit 424 may include an RF reader 508 that is coupled to the antenna 426 and the control circuit 502. The RF reader 508 may be under control by the control circuit 502 and may operate in accordance with conventional principles. For example, the RF reader may transmit an interrogation signal at regular intervals via the antenna 426 and after each interrogation signal may listen for a possible response signal/message from a nearby RFID tag (not shown in FIG. 5). The RF reader 508 may operate in accordance with a conventional standard for short distance RF communication, such as the NFC standard.

Figure 6:
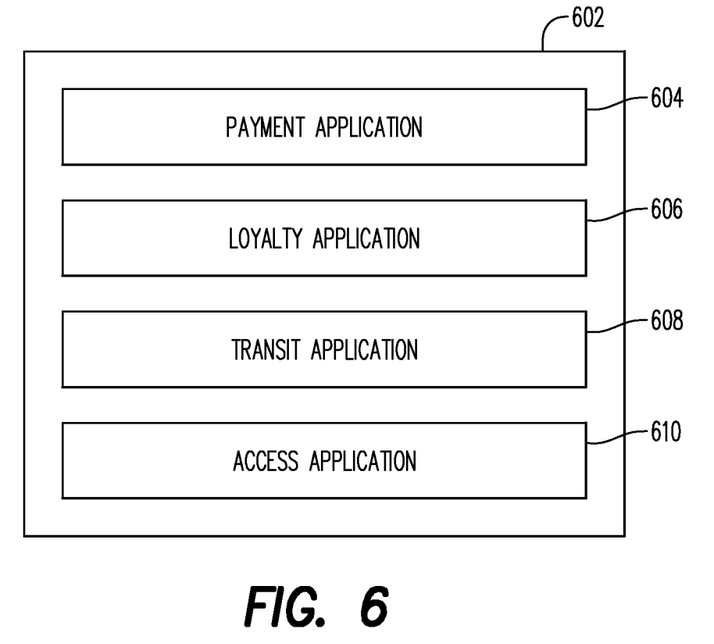
FIG. 6 illustrates in block form aspects of software that may be provided to control the proximity payment controller component of FIG. 5.

FIG. 6 illustrates in block form certain aspects of software that may be stored in the memory 504 (FIG. 5) and provided to control the payment circuit 424. In particular, the blocks shown in FIG. 6 represent constituent elements of an electronic wallet function 602 that may be implemented in the mobile telephone 400. Thus, block 604 represents a payment application program that allows the user to store and manage payment card account information in the mobile telephone 400 and that allows the mobile telephone 440 to function as a contactless payment device. In some embodiments, the payment application program may store several payment card account numbers.

Block 606 is a loyalty application program that allows the user to store and manage, in the mobile telephone 400, identification credentials (e.g., identification/loyalty account numbers) associated with retailers' customer loyalty/rewards programs. The loyalty application program also allows the mobile telephone 400 to function as a contactless identification token by transmitting the loyalty program identification numbers to proximity readers present in retail stores.

Block 608 is a transit access application program. The program 608 allows the mobile telephone 400 to function as a contactless access card for providing payment for and/or access to a mass transit system.

Block 610 is a facility access application program that allows the mobile telephone 400 to serve as a contactless key token for a building/suite access system.

It should be understood that an electronic wallet function may, in some embodiments, lack one or more of the application programs shown in FIG. 6. Also, in accordance with some embodiments, the electronic wallet function may include additional functions that are not illustrated in FIG. 6.

Figure 7:
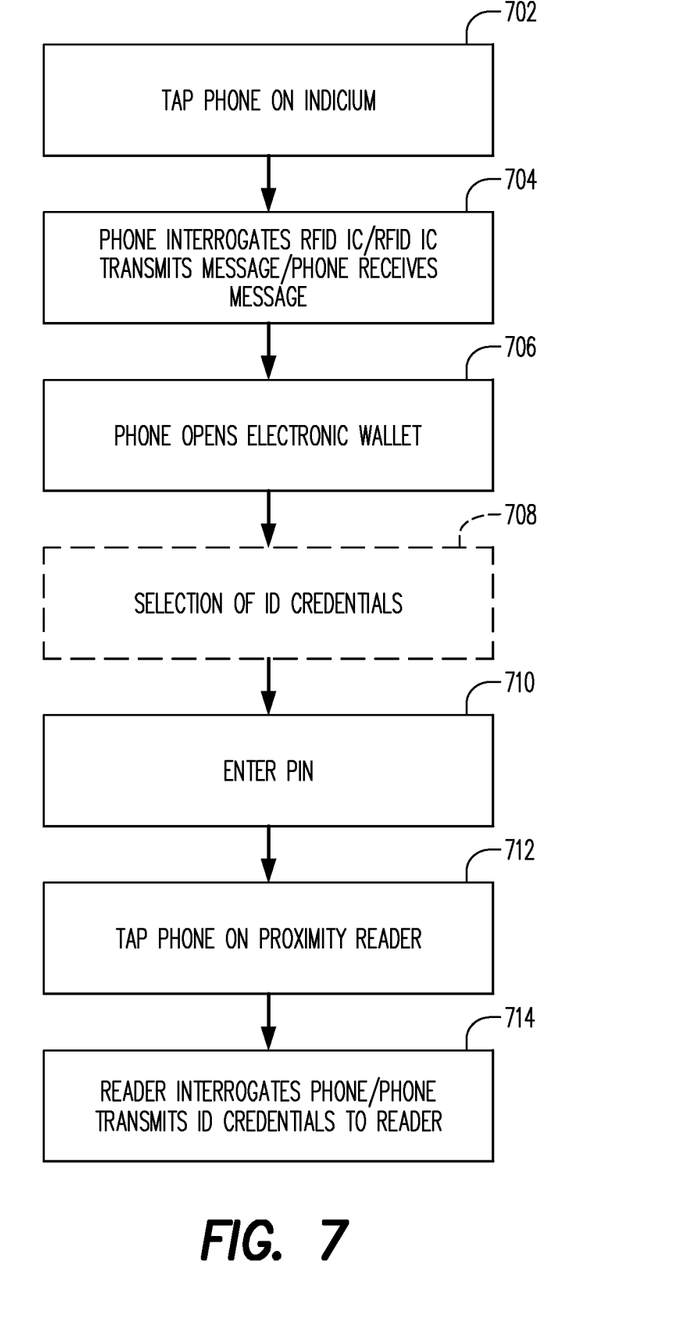
FIG. 7 is a flow chart that illustrates a process that may be involved in performing a purchase transaction at the checkout counter of FIG. 1 using the mobile telephone of FIG. 4.

FIG. 7 is a flow chart that illustrates a process that may be performed as a result of interactions between the mobile telephone 400 (FIG. 4) and the checkout counter 102.

At 702 in FIG. 7, the user taps his/her payment-enabled mobile telephone 400 on the indicium 110 (FIG. 1) of the RFID tag 108. Presumably this occurs as the user is waiting in a queue for his/her turn to engage in a purchase transaction at the POS terminal 104. At the user is tapping the mobile telephone on the indicium, the reader 508 (FIG. 5) transmits an interrogation signal via the antenna 426 (step 704, FIG. 7). The RFID tag 108 receives and is powered up by the interrogation signal; in response to the interrogation signal, the RFID tag 108 transmits a code or message that is suitable for triggering the mobile telephone 400 to open its electronic wallet function. Via the antenna 426 (FIG. 5) and the RF reader 508, the mobile telephone 400 receives the message transmitted from the RFID tag 108.

Figure 8:
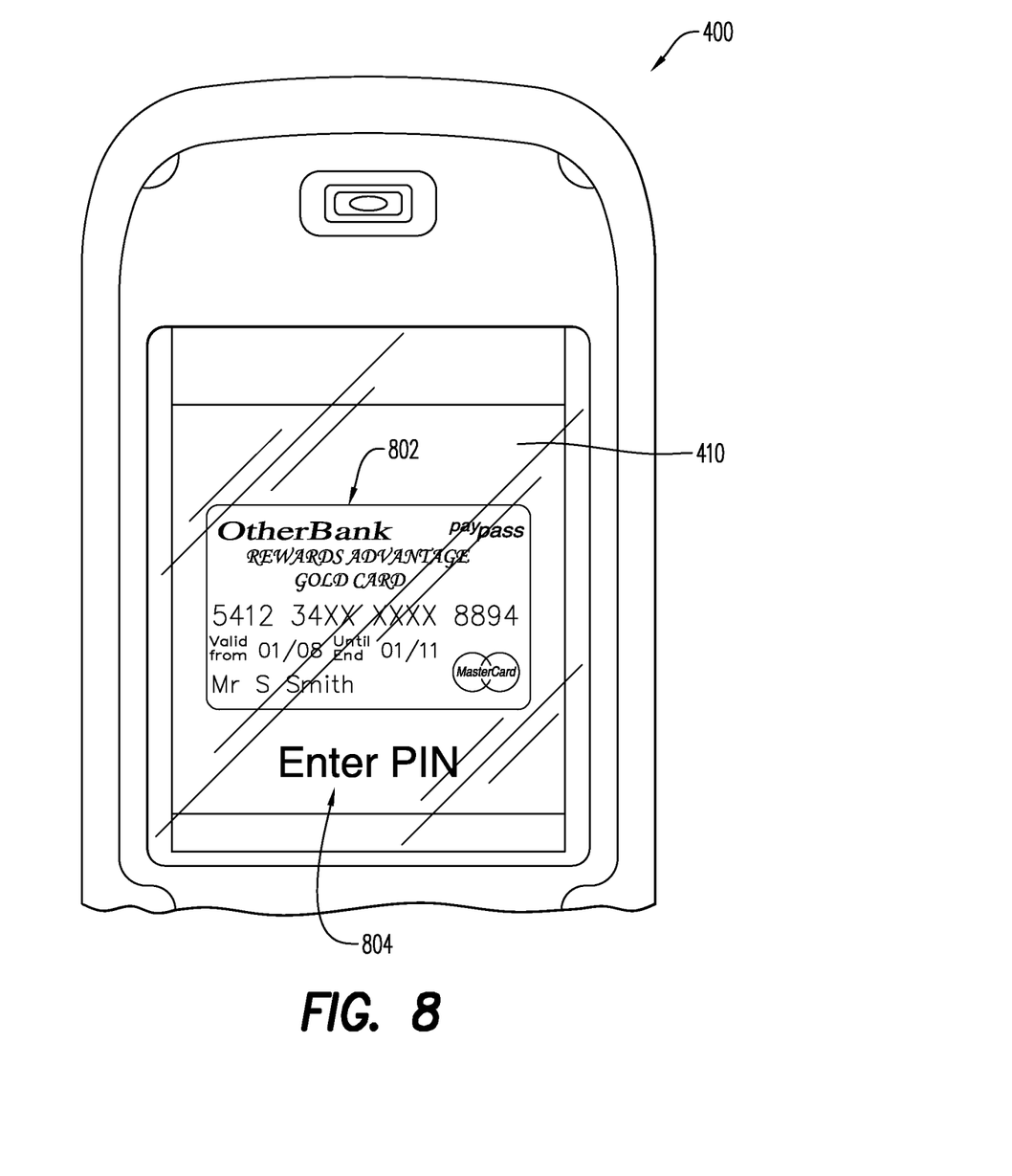
FIGS. 8 and 9 illustrate screen displays that may be presented to a user by the mobile telephone of FIG. 4 in accordance with aspects of the present invention.

At 706 in FIG. 7, and in response to receiving the message from the RFID tag 108, the mobile telephone 400 opens its electronic wallet function; in this particular instance it may be assumed that the message is also such that the mobile telephone 400 opens the payment application 604. In some circumstances (e.g., if more than one payment card account number has been stored in the payment application), it may be necessary for the user or the mobile telephone to select a particular payment card account number to be used for the ensuing purchase transaction, as indicated in phantom at 708 in FIG. 7. There are a number of ways in which this may occur. For example, the user may previously have designated a certain payment card account as the "default" account to be used for all purchases unless the user explicitly makes another selection. In this situation, in response to the message from the RFID tag, the control circuit 502 (FIG. 5) automatically selects the default payment card account number as the payment card account number to be used for the ensuing purchase transaction. In this case, and in response to the message from the RFID tag, the mobile telephone 400 may display (on the display component 410) a screen display like that shown on FIG. 8. In FIG. 8, the screen display includes an image 802 of a card that represents the default payment card account. There is also a prompt 804 that instructs the user to enter his/her PIN. (In some embodiments, if at least one other payment card account number is stored in the payment application, then the display may include another element—which is not shown—to allow the user to actuate a soft key to opt for selection of another payment card account number.)

Although it may be advantageous to display a card image, as shown in FIG. 8 and as taught by the above-referenced '704 provisional patent application, the mobile telephone may present the information to the user in other ways, including, e.g., by displaying simple strings of characters that indicate the selected payment card account number and branding information for the selected payment card account.

In another embodiment of step 708, the mobile telephone 400 selects from among a number of different payment card account numbers (previously stored in the payment application) on the basis of the message that was received from the RFID tag. This embodiment may be implemented, for example, in connection with a multi-tag purchase separator as in FIG. 3. That is, this embodiment assumes that the message received from the RFID tag corresponds to a particular brand of payment card, such that the user effectively selected the particular account to be used for the ensuing purchase by selecting which indicium to tap with his/her phone. In this case, the mobile telephone 400 selects the or a previously stored payment card account that corresponds to the payment card brand represented by the message from the RFID tag.

Figure 9:
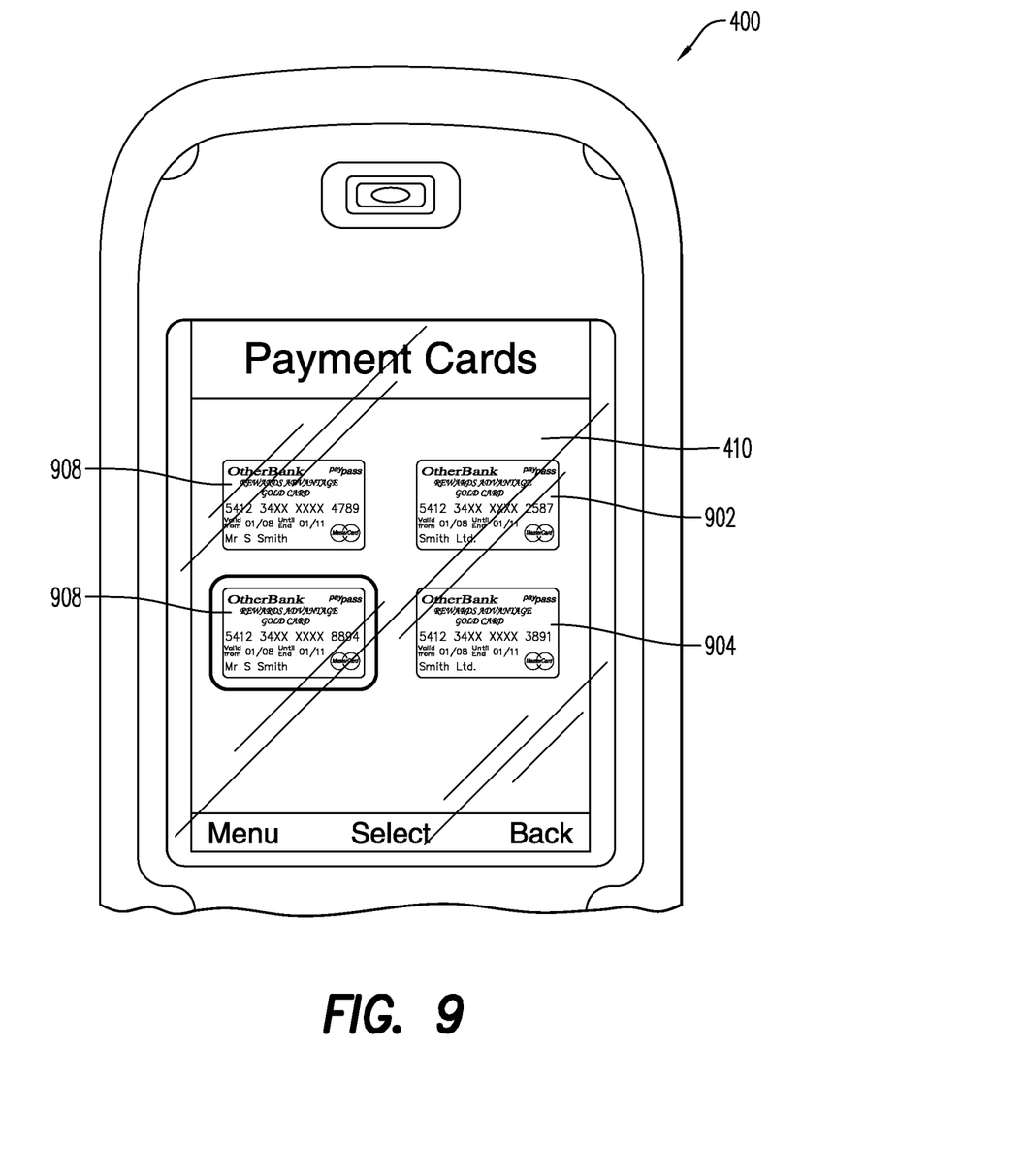

In still another scenario, the mobile telephone 400 may prompt the user to provide input into the mobile telephone to select a particular payment card account for the transaction. In some embodiments, for example, the mobile telephone may display a screen display as shown in FIG. 9 in response to receiving the message from the RFID tag. In the example screen display of FIG. 8, several card images 902, 904, 906 and 908 are shown, with each card image corresponding to a respective payment card account number previously stored in the payment application. The user may interact with the keypad 412 (FIG. 4) to make a selection from among the payment card account numbers represented by the card images. Once this has occurred, the mobile telephone 400 may present the screen display of FIG. 8, to confirm the user's selection and to prompt him/her to enter his/her PIN.

It will be understood that the payment card account selection options need not be presented as card images, as in FIG. 9. Instead, for example, the various available payment card account numbers/card brands may be displayed by the mobile telephone as simple menu options.

Returning now to FIG. 7, after step 706, and following selection of the payment card account number (if necessary), is step 710. At step 710, the user enters his/her PIN into the mobile telephone 400 by interacting with the keypad 412.

Next, at 712, the user taps the mobile telephone 400 on the proximity reader 106 (FIG. 1) of the POS terminal 104. As the user is tapping the mobile telephone on the proximity reader 106, the proximity reader 106 transmits an interrogation signal (step 714, FIG. 7). The RF transmitter 506 (FIG. 5) receives the interrogation signal; in response to the interrogation signal, the control circuit 502 causes the RF transmitter 506 to transmit the selected (assuming selection was necessary) payment card account number, and the PIN entered by the user, to the proximity reader 106. The purchase transaction then proceeds as a conventional contactless payment transaction.

In some embodiments, for security reasons, the control circuit 502 is enabled to transmit the payment card account number and the PIN only for a limited period of time after the user has entered the PIN.

The process of FIG. 7 has been explained in the context of a contactless payment transaction but in other cases could be implemented for contactless reading of other types of identification credentials, such as loyalty account/identification numbers, transit access account/identification numbers, building/facility access identification, etc.

In particular examples discussed herein, the RFID tag is adhered to a checkout counter or incorporated in a purchase separator. However, the RFID tag may be put in place near, at or upstream from the location of the point of sale/reader in many other ways. For example, when a retail store employs a rope barrier to define a queue location near the checkout counter, one or more RFID tags may be attached to the posts for the rope barrier.

Moreover, although the portable device used to read the RFID tag (and in turn to be read by the proximity reader) has been described as a mobile telephone, it may alternatively be another type of portable device, such as a personal digital assistant (PDA), or a music player (e.g., an iPod, an MP3 player).

In examples described herein, the RFID tag is passive in the sense that it is powered from the interrogation signal transmitted from the mobile device. Alternatively, however, another source of power, such as a battery or a building electrical supply, may be provided for the RFID tag.

In the event that there is an issue involving power drain from the mobile device's battery on account of the need for the RF reader 508 to transmit interrogation signals, some arrangement may be provided to trigger emitting of interrogation signals only when needed. For example, the mobile telephone may include a metal sensor to trigger interrogation signals, and the RFID tags may include a suitable type and amount of metal to be detected by the metal sensor. In another embodiment, the user may be required to actuate a switch on the mobile device to trigger transmission of interrogation signals by the mobile device. In still another embodiment, the mobile device may include an accelerometer and may initiate transmission of an interrogation signal in response to being tapped on an object.

As used herein and in the appended claims, the term "electronic wallet function" refers to a software and/or firmware function in a mobile device that makes identification credential information available for short-distance transmission from the mobile device. The term "identification credential" includes a payment card account number or any other identification code or account number that identifies the user of the mobile device.

As used herein and in the appended claims, bringing one object into proximity with another includes tapping the first object on the second, or otherwise bringing the two objects close enough together to permit NFC or similar communication between the two objects.

The above descriptions and depictions of processes, including FIG. 7, should not be considered to mandate a fixed order for performing process steps. Rather the steps may be performed in any order that is practicable.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
    bringing a mobile device into proximity with an indicium, the indicium adjacent a radio frequency identification (RFID) integrated circuit (IC) that is coupled to an antenna;
    the mobile device reading a message transmitted from the RFID IC adjacent the indicium via the antenna; and
    the mobile device responding to the message transmitted from the RFID IC adjacent the indicium by opening an electronic wallet function in the mobile device in advance of a presentation of the mobile device to a proximity reader to initiate a purchase transaction, the proximity reader being spaced apart from the indicium and the RFID adjacent to the indicium.

2. The method of claim 1, wherein the indicium and the adjacent RFID IC are located on a check-out counter, spaced apart from the proximity reader to initiate a purchase transaction.

3. The method of claim 1, wherein the indicium and the adjacent RFID IC are carried on a purchase separator, spaced apart from the proximity reader to initiate a purchase transaction.

4. The method of claim 1, wherein the electronic wallet function enables the mobile device to initiate a purchase transaction using at least one payment card account number.

5. The method of claim 1, wherein:
said indicium and said adjacent RFID IC are specific to a particular brand of payment card; and
the mobile device responds to receiving the message transmitted from the RFID IC adjacent the indicium by selecting a payment card account number that corresponds to said brand of payment card.

6. The method of claim 1, wherein the mobile device is a mobile telephone, a personal digital assistant or a music player.

7. The method of claim 1, wherein said reading includes:
the mobile device transmitting an interrogation signal to the RFID IC, the interrogation signal providing power to the RFID IC to cause the RFID IC to transmit the message.

8. A mobile device comprising:
a housing shaped and sized to be held in a user's hand;
a control circuit contained in the housing;
a radio frequency (RF) reader circuit in communication with the control circuit;
an antenna coupled to the RF reader circuit; and
a memory contained in the housing and in communication with the control circuit, the memory storing program instructions, the control circuit operative with the program instructions to:
receive a message, via the RF reader circuit, transmitted from a radio frequency identification (RFID) integrated circuit (IC) adjacent to an indicium, where the indicium is within a proximity of the mobile device; and
respond to the received message transmitted from said RFID IC adjacent the indicium by opening an electronic wallet function in the mobile device in advance of a presentation of the mobile device to a proximity reader to initiate a purchase transaction, the proximity reader being spaced apart from the indicium and the RFID adjacent to the indicium.

9. The mobile device of claim 8, further comprising:
a voice signal transceiver coupled to the control circuit and contained in the housing; and
a second antenna coupled to the voice signal transceiver for sending and receiving voice signals.

10. The mobile device of claim 8, wherein:
a contactless payment application is associated with the electronic wallet function;
the contactless payment application stores a plurality of payment card account numbers; and
the contactless payment application selects one of the plurality of payment card account numbers in response to the message transmitted from said RFID IC adjacent the indicium.

11. The mobile device of claim 8, wherein:
the electronic wallet function stores a plurality of identification numbers; and
the electronic wallet function selects one of the plurality of identification numbers in response to the message transmitted from said RFID IC adjacent the indicium.

12. The mobile device of claim 11, wherein the plurality of identification numbers includes at least one payment card account number.

13. The mobile device of claim 8, wherein the mobile device is a mobile telephone, a personal digital assistant or a music player.

14. A method comprising:
tapping a mobile telephone on an indicium to stimulate a radio frequency identification (RFID) integrated circuit (IC) adjacent the indicium to transmit a message from the RFID IC to the mobile telephone;
automatically opening an electronic wallet function in the mobile telephone in response to the message transmitted from the RFID IC, in advance of a presentation of the mobile device to a proximity reader to initiate a purchase transaction; and
tapping the mobile telephone on a proximity reader to transmit an identification number from the mobile telephone to the proximity reader to initiate a purchase transaction, the proximity reader being spaced apart from the indicium and the RFID adjacent to the indicium.

15. The method of claim 14, further comprising:
prior to tapping the mobile telephone on the proximity reader, selecting the identification number from among a plurality of identification numbers stored in the mobile telephone.

16. The method of claim 15, wherein said selecting is performed automatically by the mobile telephone in response to the message transmitted from the RFID IC.

17. The method of claim 15, wherein said selecting includes a user providing input to the mobile telephone.

18. The method of claim 14, wherein:
the proximity reader is coupled to a point of sale terminal; and
the identification number is a payment card account number.

19. The method of claim 14, wherein the indicium and the RFID IC adjacent the indicium are located at least three feet away from the proximity reader.

* * * * *